United States Patent
Ishihara et al.

(10) Patent No.: US 7,100,857 B2
(45) Date of Patent: Sep. 5, 2006

(54) RECORDING TAPE CARTRIDGE

(75) Inventors: Yusuke Ishihara, Kanagawa (JP); Kazuo Hiraguchi, Kanagawa (JP); Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 155 days.

(21) Appl. No.: 10/781,895

(22) Filed: Feb. 20, 2004

(65) Prior Publication Data

US 2004/0164198 A1    Aug. 26, 2004

(30) Foreign Application Priority Data

Feb. 21, 2003   (JP)   ............. 2003-043938

(51) Int. Cl.
   *G11B 23/04*   (2006.01)
(52) U.S. Cl. ............ 242/338.1; 242/348; 360/132
(58) Field of Classification Search ............ 242/338.1, 242/343, 348, 348.2; 360/132
   See application file for complete search history.

(56) References Cited

U.S. PATENT DOCUMENTS 6,581,866 B1   6/2003   Tsuyuki et al.
6,680,818 B1 *  1/2004   Morita et al. ............... 360/132

FOREIGN PATENT DOCUMENTS

JP   63-251983 A   10/1998

* cited by examiner

*Primary Examiner*—John Q. Nguyen
(74) *Attorney, Agent, or Firm*—Sughrue Mion, PLLC

(57) ABSTRACT

A recording tape cartridge has a reel accommodated within a case, an engaging portion provided at a floor portion of a reel hub; a braking member provided so as to be unable to rotate within the case, and approaching and moving away from the floor portion of the reel hub, and able to assume a rotation locked position at which the braking member engages with the engaging portion, and a rotation permitted position at which a state of engagement with the engaging portion is cancelled; and a releasing member disposed at an inner side of a guide wall portion provided at the floor portion of the reel hub, and when the reel is rotated, the releasing member holds the braking member at the rotation permitted position while abutting the braking member. The braking member has a tubular wall portion which overlaps with an outer side of the guide wall portion.

16 Claims, 7 Drawing Sheets

RECORDING TAPE CARTRIDGE

CROSS-REFERENCE TO RELATED APPLICATION

This application claims priority under 35 USC 119 from Japanese Patent Application No. 2003-43938, the disclosure of which is incorporated by reference herein.

BACKGROUND OF THE INVENTION

1. Field of the Invention

The present invention relates to a recording tape cartridge accommodating, within a case, a single reel on which is wound a recording tape, such as a magnetic tape or the like, which is used as a recording/playback medium mainly of computers or the like.

2. Description of the Related Art

Conventionally, recording tape cartridges (magnetic tape cartridges) have been known in which a magnetic tape, which is used as a data recording/playback medium of a computer or the like, is wound on a single reel, and the reel is accommodated in a case formed of synthetic resin. In such a recording tape cartridge, as shown in FIG. 8, at a reel 160, a reel hub 162 and a lower flange portion 164 are molded integrally of a synthetic resin. The reel hub 162 is cylindrical, and a magnetic tape T is wound therearound. The lower flange portion 164 juts out in the radial direction from the outer periphery of the bottom end of the reel hub 162. Further, an upper flange portion 166, which has the same configuration as the lower flange portion 164, is joined to the top end of the reel hub 162 by ultrasonic welding or the like.

The lower flange portion 164 side of the reel hub 162 is closed by a floor wall 168 in whose center a through hole 168A is formed. A reel gear 170, which is for driving and rotating the reel 160, is carved in an annular form at the outer peripheral portion of the bottom surface of the floor wall 168. A reel plate 172, which is an annular metal plate in which is formed a through hole 172A which is slightly smaller than the through hole 168A, is mounted by insert molding or the like to the inner side of the reel gear 170.

A circular gear opening 156 is formed in the center of the bottom surface of a lower case 154. The reel gear 170, which is provided in an annular form at the bottom surface of the reel 160, the reel plate 172, and the like, are exposed from the gear opening 156. Accordingly, the reel plate 172 of a recording tape cartridge 150 is attracted by a magnet (not illustrated) provided at a rotating shaft 200 of a drive device, and the reel gear 170 meshes with a driving gear 202 provided at the rotating shaft 200, and the reel 160 is driven to rotate.

An engaging gear 176 is carved in an annular form at the outer peripheral portion of the top surface of the floor wall 168 which faces the inner side of the reel hub 162. The engaging gear 176 meshes with a braking gear 186 of a braking member 180 which is inserted in the reel hub 162. The braking member 180 is provided so as to prevent rotation of the reel 160 when the recording tape cartridge 150 is not being used (e.g., is not loaded in a drive device or the like). The braking member 180 is formed in the shape of a disc at which the braking gear 186 is carved in an annular form at the outer peripheral portion of the bottom surface of the braking member 180.

A columnar projecting portion 184 which is substantially U-shaped in plan view (and which will hereinafter be called the U-shaped projecting portion 184) stands erect at the top surface of the braking member 180 so as to oppose the open side. The rotation of the braking member 180 is impeded due to two retention pins 194, which project so as to be lined up next to one another at the center of the inner surface of an upper case 152, being inserted in at the inner surface of the U-shaped projecting portion 184. An annular projection 192 projects at the substantial center of the inner surface of the upper case 152 and at the outer side of the retention pins 194. An annular groove 182 is provided at the top surface of the braking member 180 at the outer side of the U-shaped projecting portion 184. One end of a coil spring 190 is fit-in at the inner side of the annular projection 192, whereas the other end of the coil spring 190 is fit-in in the annular groove 182, such that the coil spring 190 is held between the upper case 152 and the braking member 180.

Accordingly, due to the braking member 180 being urged downward by the coil spring 190 and the braking gear 186 engaging with the engaging gear 176, the reel 160 does not rotate inadvertently when the recording tape cartridge 150 is not being used. Further, a substantially columnar projection 188 is inserted into the through hole 168A so as to have play therewith and to project at the center of the bottom surface of the braking member 180. When the recording tape cartridge 150 is being used, the braking member 180 is pushed upward via the projection 188 against the urging force of the coil spring 190 by an engaging member 204 provided at the center of the rotating shaft 200 of the drive device. The braking gear 186 moves apart from the engaging gear 176, and the meshing of the two is cancelled. In this way, the reel 160 becomes able to rotate. (See, for example, Japanese Patent Application Laid-Open (JP-A) No. 63-251983.)

In the recording tape cartridge 150 having a structure such as that described above, the reel gear 170 is exposed from the gear opening 156 which is formed in the bottom surface of the lower case 154. Therefore, when the recording tape cartridge 150 is not being used, it is easy for dust and the like to enter in from the gear opening 156. For example, as shown in FIG. 8, conventionally, dustproofing measures have been taken by providing an annular groove 174 at the outer side of the reel gear 170, and by fitting a rib 158, which stands erect at the peripheral portion of the gear opening 156, into this annular groove 174.

However, even with this structure, the dustproofing measures are not sufficient enough with respect to dust which enters in from the through holes 168A, 172A. Namely, because the projection 188 of the braking member 180 must be inserted into the through hole 168A so as to have play, a gap is formed between the projection 188 and the through hole 168A. There is the concern that dust or the like (shown by the arrow) will penetrate in by passing through between the braking gear 186 and the engaging gear 176, and will adhere to the magnetic tape T. Therefore, conventionally, an improvement in the dustproof quality at this portion has been desired.

SUMMARY OF THE INVENTION

In view of the aforementioned, an object of the present invention is to provide a recording tape cartridge having an excellent dustproof quality.

A first aspect of the present invention provides a recording tape cartridge comprising: a reel accommodated within a case and having a reel hub around which a recording tape is wound, an engaging portion being provided at a floor portion of the reel hub; a braking member provided nonrotatably within the case, and approaching and moving away from the floor portion of the reel hub, and able to assume a rotation locked position at which the braking member engages with the engaging portion, and a rotation permitted position at which a state of engagement with the engaging portion is released; and a releasing member disposed so as to rotate integrally with the reel at an inner side of a guide wall portion which stands erect at the floor portion of the reel hub, and when the reel is rotated, the releasing member holds the braking member at the rotation permitted position while abutting the braking member, wherein the braking member has a tubular wall portion which overlaps with an outer side of the guide wall portion at least at the rotation locked position.

In the recording tape cartridge having the above-described structure, the releasing member, which holds the braking member at the rotation permitted position, is disposed at the inner side of the guide wall portion which stands erect at the floor portion of the reel hub. Therefore, a slight gap, which enables movement of the releasing member, exists between the releasing member and the guide wall portion. Dust and the like can enter in from this gap. However, the tubular wall portion, which is formed at the braking member, overlaps with the outer side of the guide wall portion, at least at the rotation locked position. Therefore, even if dust or the like entering in from the gap makes it way to the top surface of the guide wall portion, further penetration thereof is suppressed by the tubular wall portion. Accordingly, the dust-proof quality is improved, and adhesion of dust and the like to the recording tape is prevented.

In the first aspect, the tubular wall portion may be positioned further inward than the engaging portion.

The tubular wall portion is further inward than the engaging portion, i.e., the guide wall portion and the releasing member are further inward than the engaging portion. Therefore, the engaging portion can be formed in a continuous, annular form. Accordingly, the ability of the braking member to brake the reel can be improved.

A second aspect of the present invention provides a recording tape cartridge comprising: a reel accommodated within a case and having a reel hub around which a recording tape is wound, an engaging portion being provided at a floor portion of the reel hub; a braking member, which includes a tubular portion, provided nonrotatably within the case, and approaching and moving away from the floor portion of the reel hub, and able to assume a rotation locked position at which the braking member engages with the engaging portion, and a rotation permitted position at which a state of engagement with the engaging portion is released; and a releasing member disposed so as to rotate integrally with the reel at an inner side of a guide wall portion, which stands erect at the floor portion of the reel hub, and when the reel is rotated, the releasing member holds the braking member at the rotation permitted position while abutting the braking member, wherein when the recording tape cartridge is in an assembled state, the releasing member, the guide wall portion, and the tubular wall portion are formed concavo-convexly when viewed from a side sectional view of the recording tape cartridge.

DETAILED DESCRIPTION OF THE INVENTION

Figure 1A:
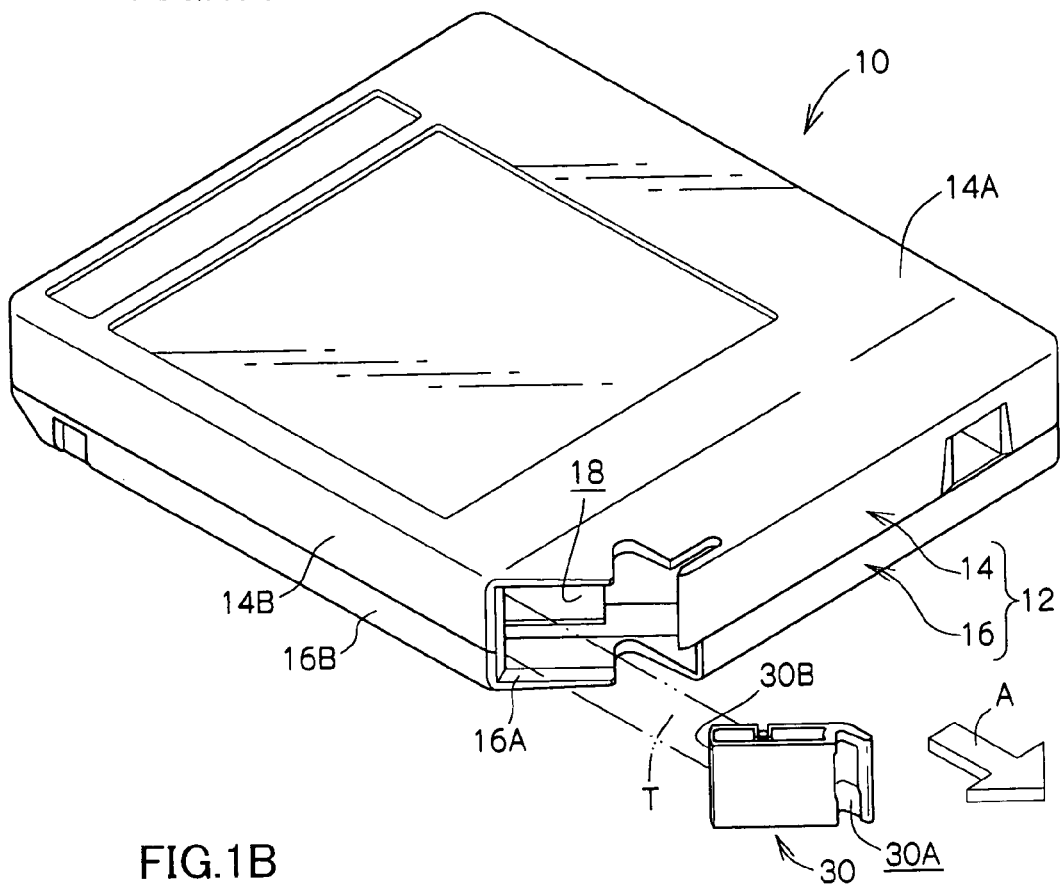
FIG. 1A is a schematic perspective view, as seen from above, of a recording tape cartridge relating to an embodiment of the present invention.

Hereinafter, a recording tape cartridge (magnetic tape cartridge) 10 relating to an embodiment of the present invention will be described on the basis of the embodiment illustrated in FIGS. 1A through 7B. Note that, for convenience of explanation, the direction of loading the recording tape cartridge 10 into a drive device is denoted by arrow A, and this direction of arrow A is the forward direction (front side) of the recording tape cartridge 10.

As shown in FIGS. 1A through 3, the recording tape cartridge 10 has a case 12. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed in a substantial box shape by the upper case 14 and the lower case 16 being joined together by ultrasonic welding or screws or the like in a state in which an open end of the peripheral wall 14B and an open end of the peripheral wall 16B abut one another.

At a corner portion of the case 12 at the leading side in the direction of loading the recording tape cartridge 10 into a drive device, the ceiling plate 14A, the peripheral wall 14B, the floor plate 16A and the peripheral wall 16B are respectively cut away, such that an opening 18, which is inclined with respect to the loading direction, is formed. A gear opening 20, which is circular and passes through the floor plate 16A, is formed in the substantially central portion of the floor plate 16A. The gear opening 20 is for exposing a reel gear 42 which will be described later. An annular rib 22 projects toward the inner side of the case 12 at the floor plate 16A at the edge of the gear opening 20, and is for positioning and for dustproofing a reel 28 which will be described later.

A pair of positioning holes 24, 26 are formed in a vicinity of the front end of the outer surface of the floor plate 16A of the case 12. The pair of positioning holes 24, 26 are formed in the shape of bags within projections (not illustrated) which stand erect from the floor plate 16A toward the interior of the case 12. The positioning holes 24, 26 are disposed so as to be separated from one another on an imaginary line which is orthogonal to the loading direction. The positioning hole 24, which is the positioning hole which is closer to the opening 18, is formed in a substantially square shape, as seen in bottom view, which circumscribes a positioning pin of a drive device. The positioning pin 26 is a long hole whose longitudinal direction runs along the aforementioned imaginary line, and whose width corresponding to the diameter of a positioning pin. Accordingly, when the recording tape cartridge 10 is loaded into a drive device and positioning pins are inserted into the respective positioning holes 24, 26, the recording tape cartridge 10 is correctly positioned in the horizontal directions (the left/right direction and the front/back direction) within the drive device.

Positioning surfaces 24A, 26A, which are finished so as to be smoother than the other portions of the floor plate 16A (the design surface of the floor plate 16A), are formed around the positioning holes 24, 26. When the positioning pins are inserted into the positioning holes 24, 26, the positioning surfaces 24A, 26A abut positioning surfaces of the drive device which are provided around the positioning pins. In this way, the vertical direction positioning of the recording tape cartridge 10 within the drive device is carried out.

Figure 2:
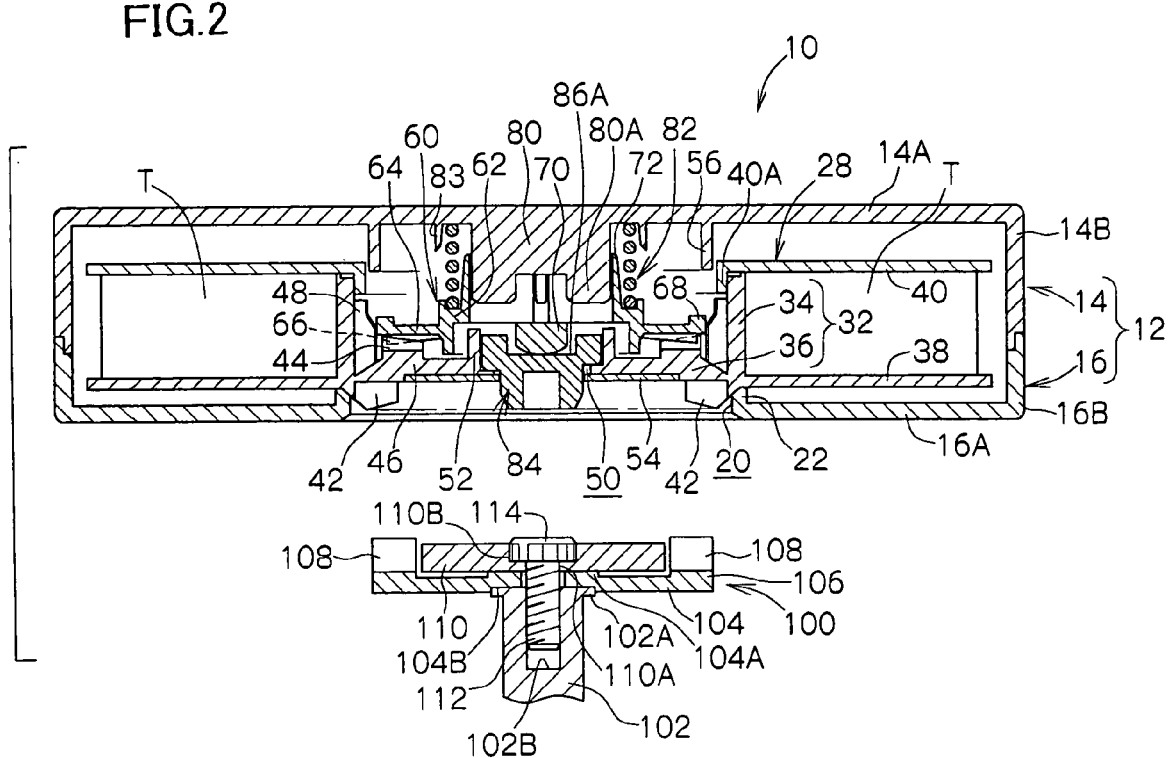
FIG. 2 is a sectional view at the time when a reel of the recording tape cartridge of FIG. 1A is at a rotation locked position.

As shown in FIG. 2, the single reel 28 is rotatably accommodated within the above-described case 12. A magnetic tape T serving as a recording tape is wound on the reel 28. A leader block 30, which serves as a pull-out member, is attached to the distal end of the magnetic tape T. When the recording tape cartridge 10 is not being used, the leader block 30 is accommodated and held at the inner side of the opening 18 of the case 12. In this state, the leader block 30 closes the opening 18, and impedes entry of dust and the like into the case 12.

An engaging recess 30A is formed at the distal end of the leader block 30. When the magnetic tape T is to be pulled-out within the drive device, a pull-out mechanism of the drive device engages the engaging recess 30A, and pulls the leader block 30 out of the case 12 and guides the leader block 30 to a take-up reel of the drive device. Moreover, the end surface of the leader block 30 at the side opposite the engaging recess 30A is an arc-shaped surface 30B. The arc-shaped surface 30B is fit into the take-up reel and forms a portion of the take-up surface around which the magnetic tape T is taken-up.

Figure 4:
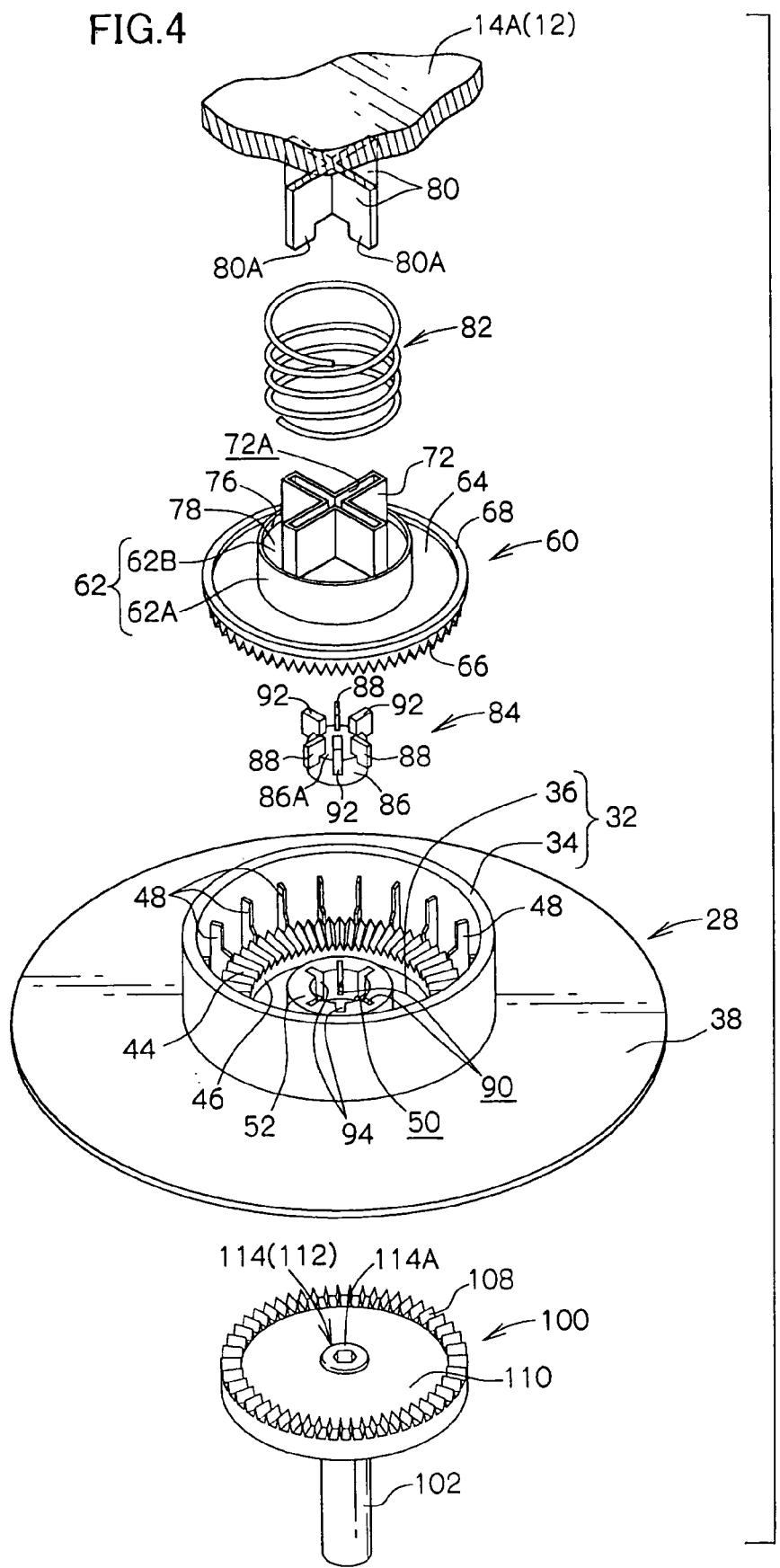
FIG. 4 is a schematic exploded perspective view, as seen from above, of a rotating shaft of a drive device and a braking mechanism of the recording tape cartridge of FIG. 1A.
Figure 5:
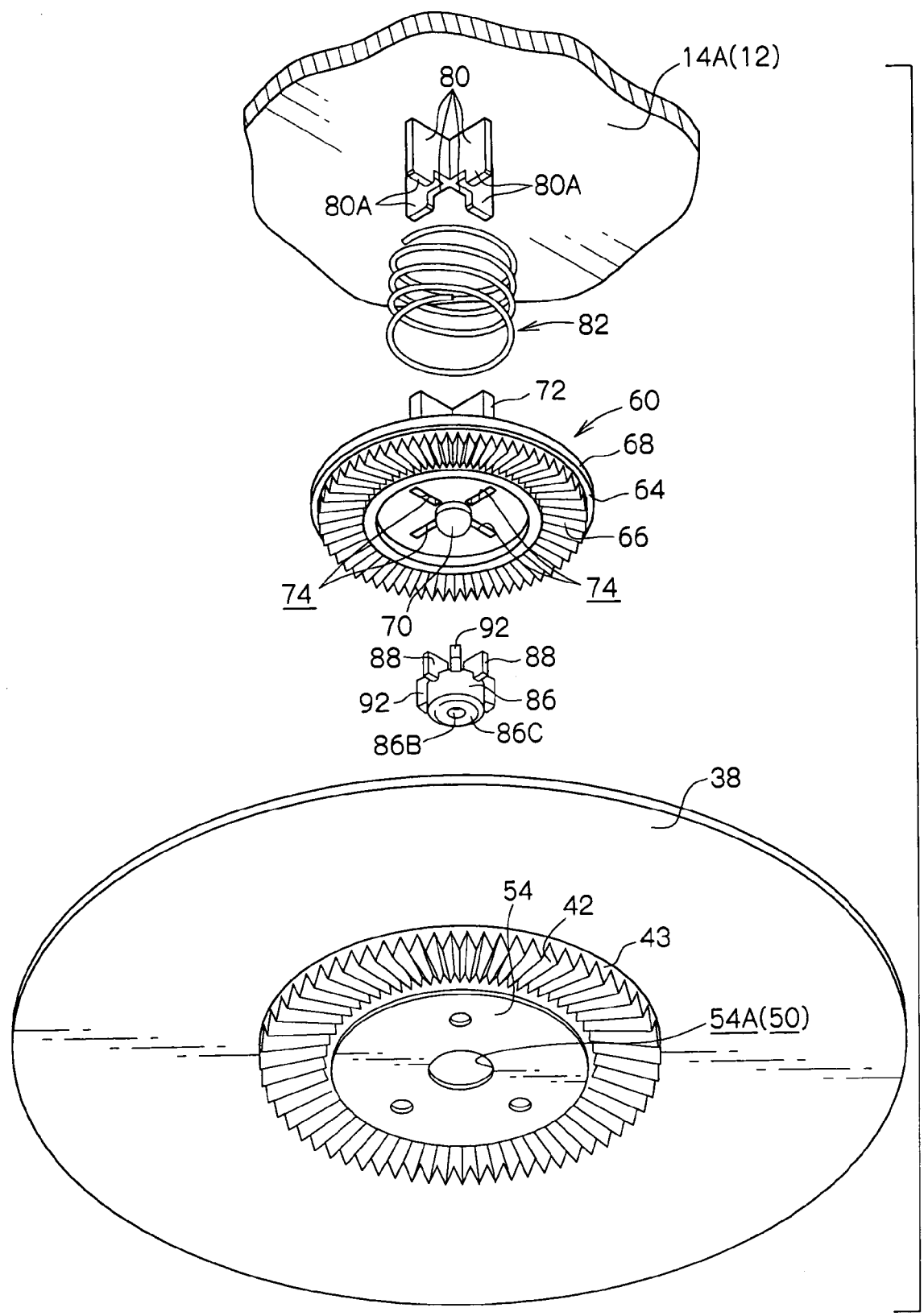
FIG. 5 is a schematic exploded perspective view, as seen from below, of the braking mechanism of the recording tape cartridge of FIG. 1A.

Next, the braking mechanism for impeding rotation of the reel 28 when the reel 28 and the recording tape cartridge 10 are not being used will be described in detail. As shown in FIGS. 4 and 5, the reel 28 has a reel hub 32 which structures the axially central portion of the reel 28. The reel hub 32 is formed substantially in the shape of a hollow cylinder having a bottom, and has a cylindrical portion 34 around whose outer peripheral surface the magnetic tape T is wound, and a floor portion 36 which closes the bottom portion of the cylindrical portion 34. Moreover, a lower flange 38 extends coaxially and integrally at the radial direction outer side of a vicinity of the floor portion 36 side end portion (i.e., the bottom end portion) of the reel hub 32.

On the other hand, an upper flange 40 is joined to the top end portion of the reel hub 32. (The upper flange 40 is omitted from illustration in FIGS. 4 and 5.) The outer diameter of the upper flange 40 is the same as the outer diameter of the lower flange 38. A short tube portion 40A, whose outer diameter corresponds to the inner diameter of the cylindrical portion 34, is provided at the axially central portion of the upper flange 40. The upper flange 40 is coaxially fixed to the reel hub 32 by ultrasonic welding in a state in which the short tube portion 40A is fit into the cylindrical portion 34 in a vicinity of the top end thereof. In this way, at the reel 28, the magnetic tape T is wound on the outer peripheral surface of the cylindrical portion 34 of the reel hub 32 between the opposing surfaces of the lower flange 38 and the upper flange 40. The cylindrical portion 34 is open upwardly.

The reel gear 42, which is formed overall in an annular shape which is coaxial with the reel 28, is formed in a vicinity of the outer periphery of the bottom surface (outer surface) of the floor portion 36 of the reel hub 32. The reel gear 42 can mesh with a driving gear 108 which is provided at the distal end of a rotating shaft 100 (to be described later) of a drive device. The addendum of the reel gear 42 project further downward than the bottom surface of the lower flange 38. The teeth bottoms of the reel gear 42 are positioned above the bottom surface of the lower flange 38. The radial direction outer side end portions of the respective teeth are connected by a taper portion 43 which is continuous with the lower flange 38 from the central portions in the heightwise direction of the teeth to the teeth bottoms.

An engaging gear 44, which serves as an engaging portion and which is formed overall in an annular shape which is coaxial with the reel 28, is provided at the vicinity of the outer periphery of the top surface (the inner surface) of the floor portion 36 of the reel hub 32. The engaging gear 44 is formed on an annular pedestal portion 46 which protrudes slightly from the inner surface of the floor portion 36, and can mesh with a braking gear 66 of a braking member 60 which will be described later.

A plurality of standing ribs 48, which are continuous at the inner surface of the cylindrical portion 34 and the top surface of the floor portion 36, are provided at uniform intervals in the peripheral direction along the axial direction of the reel 28 at the radial direction outer side of the engaging gear 44 (the pedestal portion 46). Due to the existence of these standing ribs 48, the engaging gear 44 is positioned further toward the radial direction inner side than the reel gear 42. (Namely, the engaging gear 44 is provided along a circumference having a smaller diameter than that of the reel gear 42, and in the present embodiment, overlaps with a portion of the reel gear 42.) The standing ribs 48 will be described later together with the braking member 60.

A through hole 50, which passes through the floor portion 36, is provided at the axially central portion of the floor portion 36 of the reel hub 32. A boss portion 52 for a clutch, which is shaped as a short cylinder and serves as a guide wall portion, stands erect along the edge of the through hole 50 from the top surface of the floor portion 36. The boss portion 52 for a clutch will be described later together with a clutch member 84.

The portions of the above-described reel 28, other than the upper flange 40, are formed integrally of a resin. Moreover, a reel plate 54, which is an annular plate formed of a magnetic material, is provided coaxially and integrally by insert molding at the inner side of the reel gear 42 at the bottom surface of the floor portion 36 of the reel hub 32. A through hole 54A is formed in the axially central portion of the reel plate 54. The inner diameter of the through hole 54A is formed so as to be slightly smaller than the inner diameter of the through hole 50.

The reel 28 is accommodated within the case 12, and is set on the annular rib 22 when the recording tape cartridge 10 is not in use. Specifically, the portion of the floor portion 36 at the outer side of the taper portion 43 (i.e., a vicinity of the inner edge of the lower flange 38) abuts the top end surface of the annular rib 22, and radial direction movement of the reel 28 is restricted due to the inner edge portion of the top end of the annular rib 22 being a taper surface 22A corresponding to the taper portion 43. Entry of dust or the like therefrom can thereby be impeded.

Figure 1B:
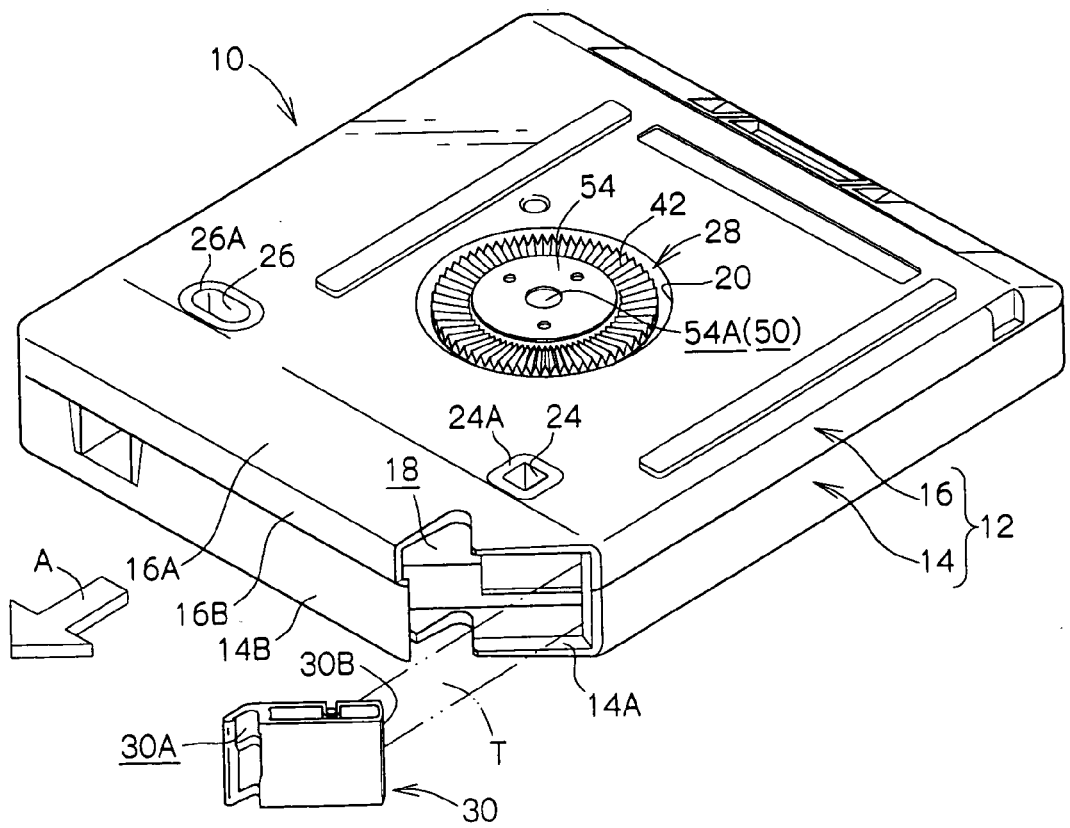
FIG. 1B is a schematic perspective view, as seen from below, of the recording tape cartridge of FIG. 1A.

In this state, the reel 28 is positioned on the whole within the case 12, and the reel gear 42 and the reel plate 54 are exposed from the gear opening 20 (see FIG. 1B). Namely, the reel gear 42 faces the exterior of the case 12 from the gear opening 20, without projecting out from the outer surface (the bottom surface) of the floor plate 16A. Further, the through hole 50 faces the gear opening 20 through the through hole 54A of the reel plate 54.

In this way, the reel 28 can be operated, i.e., chucked (held) and driven to rotate, from the exterior of the case 12. Further, in this state, an annular restricting rib 56, which stands erect from the ceiling plate 14A, is disposed in the top portion of the cylindrical portion 34 of the reel 28. The outer peripheral surface of the restricting rib 56 is adjacent to the inner peripheral surface of the short tube portion 40A of the upper flange 40, such that joggling of the reel 28 within the case 12 is prevented.

The recording tape cartridge 10 has a braking mechanism for impeding rotation of the reel 28 when the recording tape cartridge 10 is not in use. This braking mechanism has the braking member 60 which serves as a braking member. The braking member 60 has a base portion 62. The base portion 62 is substantially formed as a hollow cylinder which has a bottom and which opens downward, by a tubular portion 62A formed in the shape of a short tube and serving as a tubular wall portion, and a disc portion 62B which closes the top end of the tubular portion 62A. The outer diameter of the tubular portion 62A is smaller than the inner diameter of the engaging gear 44 (the pedestal portion 46). The inner diameter of the tubular portion 62A is larger than the outer diameter of the boss portion 52 for a clutch.

A ring portion 64 formed in an annular form extends outwardly in the radial direction along the entire periphery, from an axial direction intermediate portion at the outer peripheral portion of the base portion 62 (the tubular portion 62A). The braking gear 66 is provided along the entire periphery at the bottom surface of the ring portion 64. Namely, the braking gear 66 is formed in an annular form overall. The braking gear 66 is structured so as to be able to mesh with the engaging gear 44 of the reel 28.

The inner end portions of the respective teeth forming the braking gear 66 are connected by the tubular portion 62A. The outer end portions of the teeth, which are in a free state, are positioned slightly further inward, in the radial direction, than the outer edge of the ring portion 64. In other words, the ring portion 64 juts out further outwardly in the radial direction than the braking gear 66. More specifically, the outer diameter of the ring portion 64 is slightly larger than the outer diameter of the engaging gear 44, and the outer diameter of the braking gear 66 is slightly smaller than the outer diameter of the engaging gear 44. Moreover, an annular reinforcing rib 68 stands erect at the top surface of the ring portion 64 along the outer edge portion thereof, such that the rigidity of the ring portion 64 (the braking gear 66) is ensured.

A slide-contact projection 70 projects from the axially central portion of the bottom surface of the disc portion 62B of the base portion 62 (i.e., the tubular portion 62A inner side). The distal end portion of the slide-contact projection 70 is formed in the shape of a spherical surface, and substantially point-contacts the clutch member 84 which will be described later. The distal end of the slide-contact projection 70 is positioned slightly higher than the bottom end surface of the tubular portion 62A (i.e., at the inner side of the tubular portion 62A). On the other hand, a cross-shaped projection 72 stands erect at the top surface of the disc portion 62B. An insertion groove 72A, which is substantially cross-shaped in plan view, is formed in the cross-shaped projection 72. Through holes 74, which pass through the disc portion 62B in the direction of plate thickness thereof, are formed in the disc portion 62B.

Four of the through holes 74 are formed so as to communicate with the radial direction outer side portions of the insertion groove 72A, except for the axially central portion of the insertion groove 72A which is formed in a cross-shape in plan view (i.e., except for the intersection portion of the insertion groove 72A). The through holes 74 are respectively formed in rectangular shapes. In this way, the respective through holes 74 are positioned adjacent to the radial direction outer side of the slide-contact projection 70, and open to the interior of the tubular portion 62A. Further, an annular rib 76 stands erect at the outer peripheral portion of the top end of the base portion 62. The top surface of the disc portion 62B between the rib 76 and the cross-shaped projection 72 is a spring receiving surface 78 which one end portion of a compression coil spring 82 (which will be described later) abuts.

The braking member 60, which has been described above, is inserted substantially coaxially in the cylindrical portion 34 of the reel hub 32 so as to be movable in the vertical direction (the axial direction of the reel 28). Namely, due to the braking member 60 moving in the vertical direction, the braking member 60 can be set at a position at which the braking gear 66 meshes with the engaging gear 44 of the reel hub 32 (a rotation locked position), and a position at which this meshing is released (a rotation permitted position).

Figure 6:
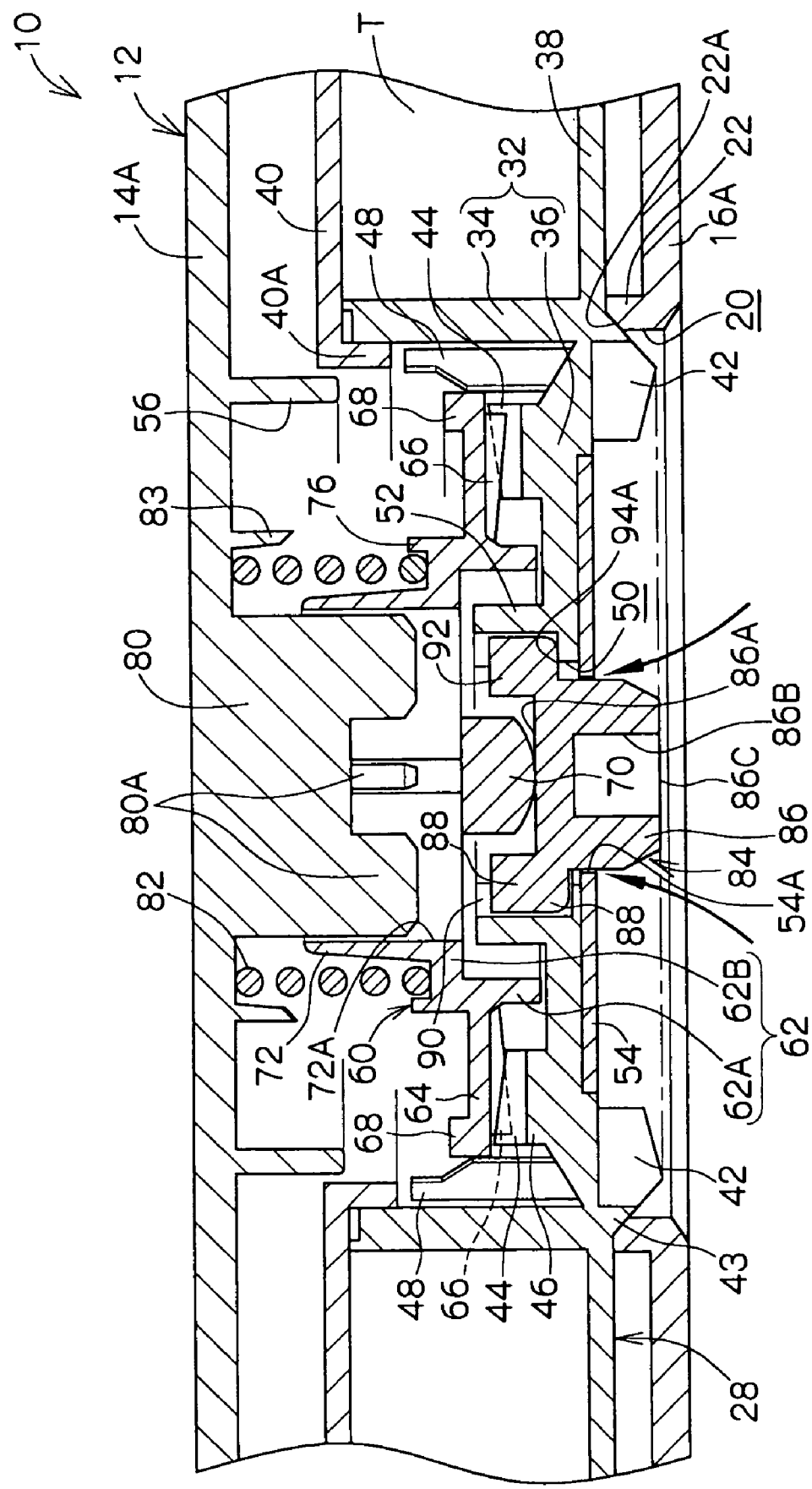
FIG. 6 is an enlarged sectional view of main portions at the time when the reel of the recording tape cartridge of FIG. 1A is at the rotation locked position.

As shown in FIG. 6, the length of the tubular portion 62A is determined such that, when the braking member 60 is positioned at the rotation locked position, the bottom end surface of the braking member 60 does not abut the floor portion 36 but is as close as possible thereto. In this way, when the tubular portion 62A is provided so as to extend over a long length downward, the strength of the braking member 60 can be improved. At the same time, the dustproof quality of the recording table cartridge 10 can be improved.

Namely, at least when the recording tape cartridge 10 is not being used (i.e., when the braking member 60 is at the rotation locked position), even if dust or the like enters in from the clearances between the boss portion 52 for a clutch and the clutch member 84 (clearances C1, C2 to be described later) and comes out to the top surface of the boss portion 52 for a clutch, the tubular portion 62A is disposed so as to overlap the outer side of the boss portion 52 for a clutch as seen in side sectional view, i.e., so as to surround (cover) the boss portion 52 for a clutch from the top side and from the outer side in a non-contact state. Therefore, this region is a labyrinthine structure, and further penetration of dust and the like is impeded. In this way, the dustproof quality of the recording tape cartridge 10 is sufficiently ensured, and the adhesion of dust and the like to the magnetic tape T is prevented.

A cross-shaped rib 80, which projects downward from the ceiling plate 14A of the case 12, is disposed in the insertion groove 72A of the cross-shaped projection 72 of the braking member 60. The cross-shaped rib 80 is formed in the shape of a detent which is formed as if two thin plates intersect one another orthogonally. Due to the cross-shaped rib 80 engaging with the cross-shaped projection 72 (the groove walls of the insertion groove 72A), rotation of the braking member 60 with respect to the case 12 is impeded. Accordingly, the braking member 60 impedes rotation of the reel 28 in a state in which the braking gear 66 meshes with the engaging gear 44 of the reel hub 32.

Note that the state in which the cross-shaped rib 80 is inserted in the insertion groove 72A is maintained over the entire stroke of movement of the braking member 60 in the vertical direction, such that the cross-shaped rib 80 also functions to guide the direction of movement of the braking member 60 in the vertical direction. Moreover, projecting pieces 80A extend from the bottom end portion of the cross-shaped rib 80 at positions corresponding to the respective through holes 74 of the braking member 60. The widths of the respective projecting pieces 80A (i.e., the lengths of the projecting pieces 80A in the radial direction of the braking member 60) are narrow in accordance with the lengthwise dimensions of the respective through holes 74, and the projecting pieces 80A enter into respectively different ones of the through holes 74.

When the braking member 60 is positioned at the rotation locked position, the respective projecting pieces 80A are positioned within the insertion groove 72A. When the braking member 60 is at the released position, the projecting pieces 80A enter into the through holes 74 and project from the bottom surface of the disc portion 62B (i.e., pass through the through holes 74). In this way, due to the projecting pieces 80A being formed so as to extend, the cross-shaped rib 80 not only impedes rotation of the braking member 60 with respect to the case 12, but also, the amount thereof which is engaged with the braking member 60 (the depth of insertion thereof into the braking member 60) is greatly increased, and the cross-shaped rib 80 suppresses tilting of the braking member 60 with respect to the case 12. Further, the cross-shaped rib 80 which has this structure has an improved ability to guide the braking member 60 in the vertical direction. Note that, in the present embodiment, the engaged amount, in the axial direction, of the cross-shaped rib 80 (including the projecting pieces 80A) with the braking member 60 which is positioned at the rotation locked position, is set to be sufficiently larger than the entire stroke of movement of the braking member 60.

When the braking member 60 is positioned at the rotation locked position, radial direction movement of the reel 28 is restricted by the standing ribs 48. When the braking member 60 is positioned at the rotation permitted position, there is no fear of interference between the braking member 60 and the standing ribs 48 which are rotating together with the reel 28. Therefore, the standing ribs 48 are positioned adjacent to the reinforcing rib 68 of the ring portion 64 of the braking member 60 which is positioned at the rotation locked position, and the top portions of the standing ribs 48 are cut away such that the gap between the standing ribs 48 and the reinforcing rib 68 of the braking member 60 positioned at the rotation permitted position is greater than or equal to a predetermined value. In this way, not only is movement of the reel 28 directly restricted by the case 12, but also, inavicinity of the position of the center of gravity thereof, radial direction movement of the reel 28 with respect to the case 12 is restricted via the braking member 60. The recording tape cartridge 10 can also be loaded stably in standing-type drive devices (in which the axis of the reel 28 is the horizontal direction).

The compression coil spring 82, which can be interpreted in the broad sense as an urging mechanism, is disposed between the ceiling plate 14A and the spring receiving surface 78 of the braking member 60. One end portion of the compression coil spring 82 abuts the spring receiving surface 78, whereas the other end portion thereof abuts the ceiling plate 14A. This other end portion is positioned at the inner side of an annular wall portion 83 which projects at the outer side of the cross-shaped rib 80 at the ceiling plate 14A, such that the position of the compression coil spring 82 does not become offset in the radial direction.

Due to the urging force of the compression coil spring 82, the braking member 60 is urged downward, and usually, the braking gear 66 meshes with the engaging gear 44 such that inadvertent rotation of the reel 28 is reliably prevented (i.e., the braking member 60 is positioned at the rotation locked position). Further, due to this urging force, the reel 28, which meshes with the braking member 60 at the engaging gear 44, also is urged downward and abuts the annular rib 22 such that the reel 28 does not joggle within the case 12.

The recording tape cartridge 10 is provided with the clutch member 84 which serves as a releasing member and which is operated from the exterior at the time of releasing the state in which the reel 28 is locked by the braking member 60. The clutch member 84 is disposed between the floor portion 36 of the reel 28 and the braking member 60. The clutch member 84 has a clutch main body 86 which is formed as a substantially cylinder-shape. The outer diameter of the clutch main body 86 is formed so as to be slightly smaller than the through hole 54A of the reel plate 54, i.e., the inner diameter of the through hole 50 which coincides with the inner diameter of the boss portion 52 for a clutch.

Figure 7A:
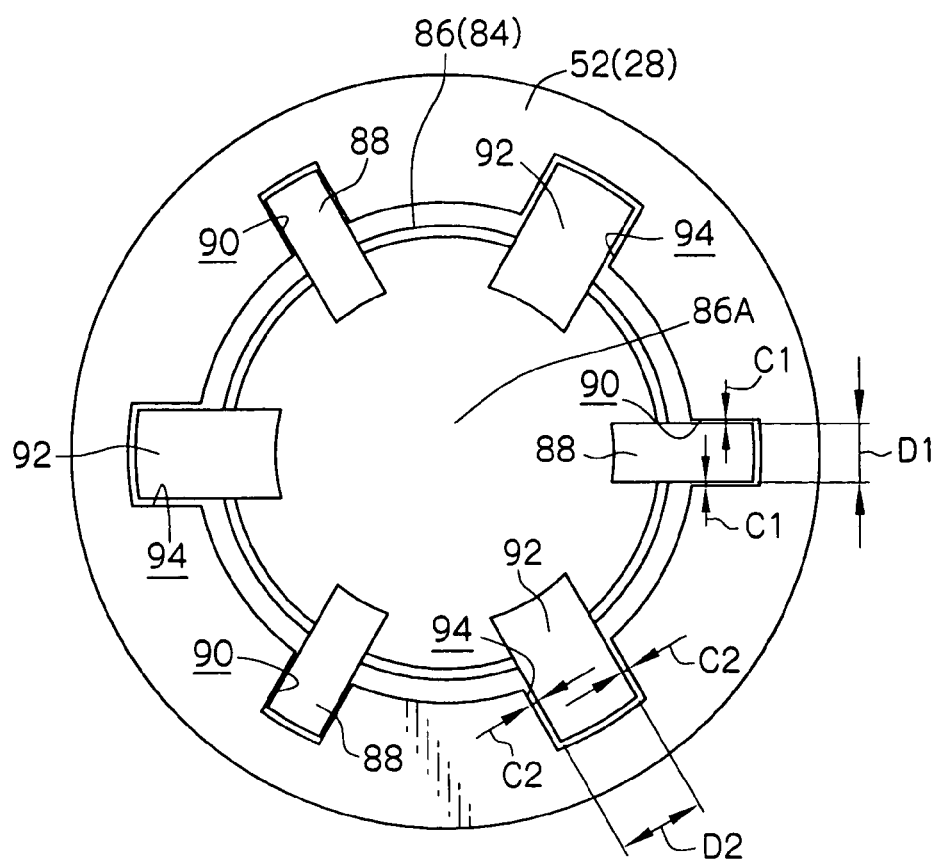
FIG. 7A is a plan view showing a state of assembly, to the reel, of a clutch member of the recording tape cartridge of FIG. 1A.
Figure 7B:
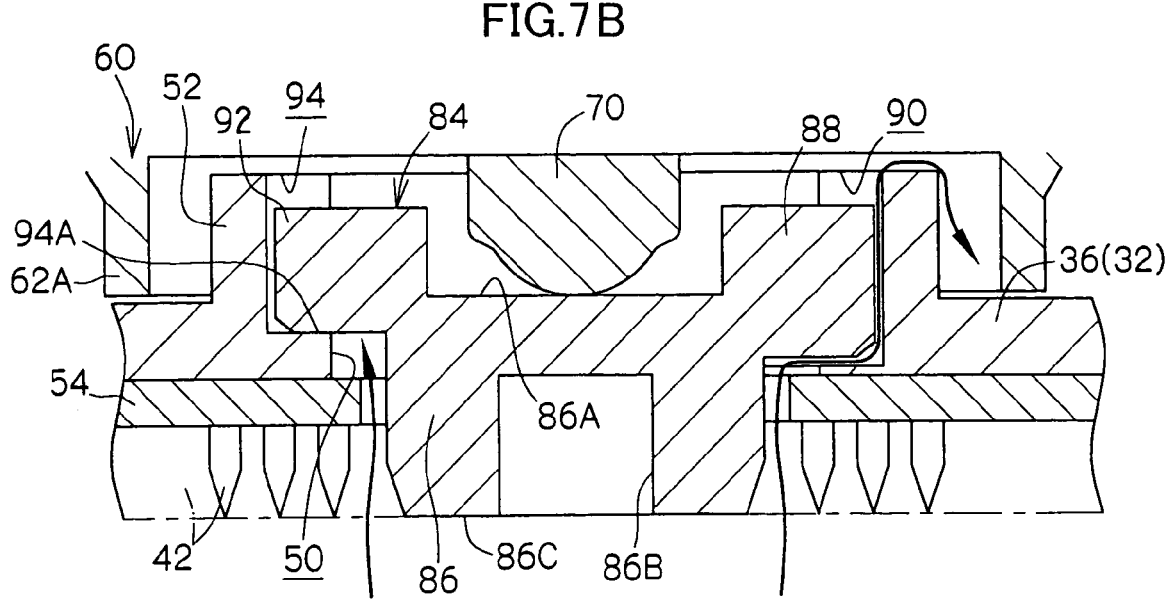
FIG. 7B is a sectional view showing the state of assembly, to the reel, of the clutch member shown in FIG. 7A.
Figure 8:
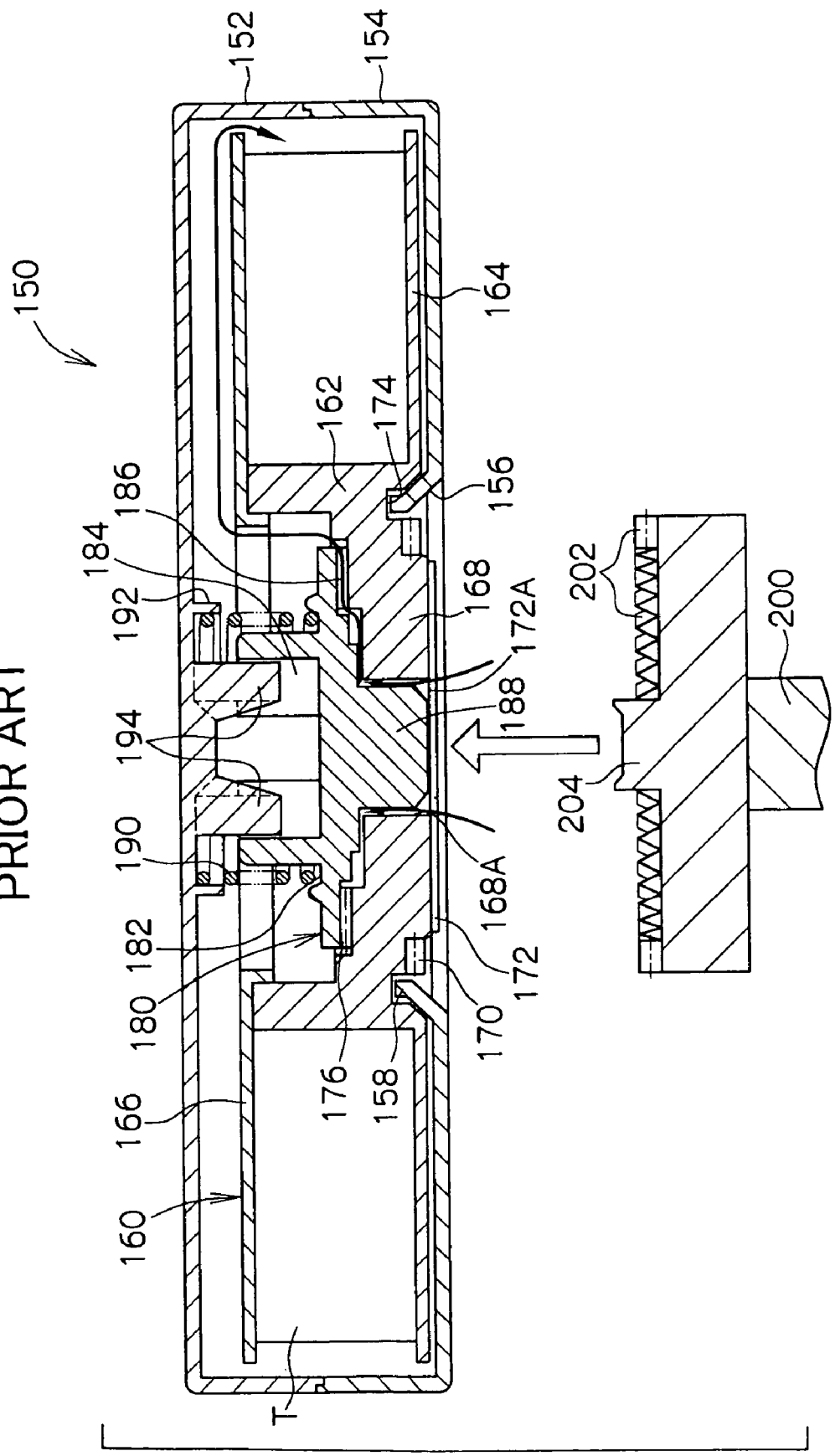
FIG. 8 is a sectional view at the time when a reel of a conventional recording tape cartridge is at a rotation locked position.

As shown in FIG. 7B as well, the flat top end surface of the axially central portion of the clutch main body 86 is a slide-contact surface 86A which always abuts the slide-contact projection 70 of the braking member 60. The flat bottom end surface of the clutch main body 86, which is around a hollowed portion 86B that opens downward, is a press operation surface 86C. When the press operation surface 86C of the clutch member 84 is pressed, the clutch member 84 moves upward against the urging force of the compression coil spring 82, and moves the braking member 60 to the rotation permitted position.

The clutch member 84 has rotation restricting ribs 88 (first or second ribs) which jut out further toward the outer side in the radial direction than the outer peripheral surface of the clutch main body 86. A plurality of the rotation restricting ribs 88 (three in the present embodiment) are provided at uniform intervals in the peripheral direction of the clutch main body 86. The rotation restricting ribs 88 are disposed in a radial arrangement as seen in plan view. The respective rotation restricting ribs 88 project further upward than the slide-contact surface 86A, so as to extend between (connect) the top end surface of the clutch main body 86 around the slide-contact surface 86A and the outer peripheral surface of the clutch main body 86 in a vicinity of the top end surface thereof.

The rotation restricting ribs 88 are disposed within rotation restricting grooves 90 which are formed in a recessed manner from the inner edge portion of the boss portion 52 for a clutch. Namely, three of the rotation restricting grooves 90 are provided at uniform intervals in the peripheral direction of the boss portion 52 for a clutch. The rotation restricting grooves 90 open upwardly at the top end of the boss portion 52 for a clutch. In this way, the clutch member 84 can move in the vertical direction while being guided, at the rotation restricting ribs 88, by the rotation restricting grooves 90 of the boss portion 52 for a clutch.

Figure 3:
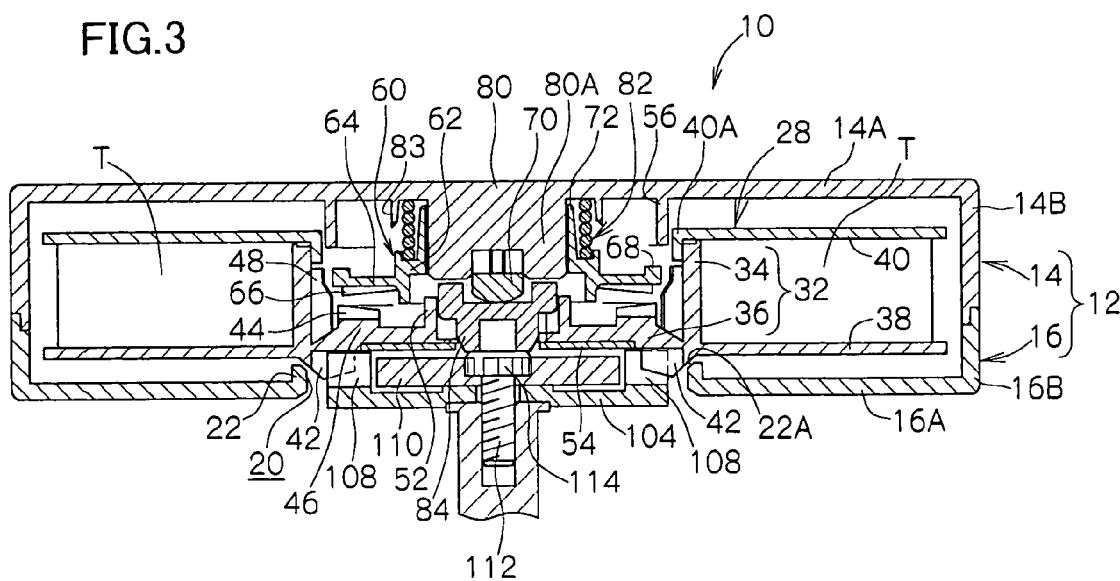
FIG. 3 is a sectional view at the time when the reel of the recording tape cartridge of FIG. 1A is at a rotation permitted position.

Also when the clutch member 84 moves upward and the braking member 60 is positioned at the rotation permitted position, the state in which the rotation restricting ribs 88 are disposed in the rotation restricting grooves 90 of the boss portion 52 for a clutch is maintained. In this way, the clutch portion 84 cannot rotate relative to the reel 28, i.e., always rotates integrally with the reel 28. Note that, at this time, as shown in FIG. 3, it is preferable that the bottom end surface of the tubular portion 62A is positioned lower than the top end surface of the boss portion 52 for a clutch. In this way, dustproofing is promoted also when the recording tape cartridge 10 is in use (i.e., when the braking member 60 is at the rotation permitted position).

In addition, because the rotation restricting grooves 90 are closed at the bottom end portion of the boss portion 52 for a clutch, falling-out of the clutch member 84 from the reel hub 32 can be impeded by the rotation restricting ribs 88 and the rotation restricting grooves 90. Further, in the present embodiment, separately from the rotation restricting ribs 88, the clutch member 84 has seat ribs 92 (first or second ribs) which impede falling-out of the clutch member 84 from the reel hub 32.

A plurality of the seat ribs 92 are provided at uniform intervals in the peripheral direction of the clutch main body 86. In the present embodiment, a total of three of the seat ribs 92 are provided at intermediate portions, in the peripheral direction, between the respective rotation restricting ribs 88. In the same way as the rotation restricting ribs 88, the seat ribs 92 project upward and outward in the radial direction so as to extend between the top end surface of the clutch main body 86 around the slide-contact surface 86A and the outer peripheral surface of the clutch main body 86 in a vicinity of the top end surface thereof, and are disposed in a radial arrangement as seen in plan view (see FIGS. 4 and 5).

As shown in FIG. 7A, the respective seat ribs 92 are disposed in stopper grooves 94 which are recessed in from the inner edge portion of the boss portion 52 for a clutch. Namely, the stopper grooves 94 are provided at uniform intervals in the peripheral direction of the boss portion 52 for a clutch, at the respective intermediate portions in the peripheral direction between the respective rotation restricting grooves 90. The stopper grooves 94 are open upwardly at the top end of the boss portion 52 for a clutch. The top surfaces of the floor portions which close the bottom end portions of the stopper grooves 94 are stopper surfaces 94A (see FIG. 7B). When the braking member 60 is at the rotation locked position, the bottom end surfaces of the seat ribs 92 abut (sit on) the stopper surfaces 94A.

The clutch main body 86, the rotation restricting ribs 88, and the seat ribs 92 of the clutch member 84 are formed integrally by resin molding. As shown in FIG. 7B, the heights of the top end surfaces of the respective rotation restricting ribs 88 and the respective seat ribs 92 coincide. However, the bottom end surfaces of the rotation restricting ribs 88 are formed to be positioned lower than the bottom end surfaces of the seat ribs 92. In correspondence therewith, the top ends of the stopper grooves 94 and the rotation restricting grooves 90, which both are open at the top end of the boss portion 52 for a clutch, coincide, but the floor surfaces of the rotation restricting grooves 90 are positioned lower than those of the stopper surfaces 94A of the stopper grooves 94. In other words, the rotation restricting ribs 88 are longer, in the vertical direction, than the seat ribs 92, and the rotation restricting grooves 90 are deeper, in the vertical direction, than the stopper grooves 94.

The reasons for this are as follows. By making the amount by which the rotation restricting ribs 88 and the boss portion 52 for a clutch can be engaged (i.e., the amount by which the rotation restricting ribs 88 can be inserted into the rotation restricting grooves 90) large, the stress received from the reel 28 when the reel 28 rotates can be mitigated. At the same time, the ability to guide the clutch member 84 when the clutch member 84 is moving up and down improves, and joggling of the clutch member 84 also when the braking member 60 is positioned at the rotation permitted position is suppressed.

In order to further suppress such joggling, as shown in FIG. 7A, a clearance C1 at one peripheral direction side between the rotation restricting rib 88 and the rotation restricting groove 90 is small to the extent that the sliding resistance at the time when the clutch member 84 moves up and down is not excessive. Moreover, the thickness of the rotation restricting rib 88 (i.e., the thickness thereof in the peripheral direction of the clutch member 84) is made to be thin within a range which does not present problems with respect to strength. The dimensional accuracy, resulting from the resin molding, of the rotation restricting rib 88 is high. Therefore, the clearance C1 can be made to be even smaller. In the present embodiment, a thickness D1 of the rotation restricting rib 88 is 1.5 mm, and the clearance C1 is 0.05 mm.

On the other hand, the thickness of the seat rib 92 (i.e., the thickness thereof in the peripheral direction of the clutch member 84) is sufficiently larger than the thickness of the rotation restricting rib 88. In this way, when the seat ribs 92 abut the stopper surfaces 94A, sufficient rigidity can be ensured with respect to the urging force of the compression coil spring 82 which is applied via the braking member 60. By making the seat ribs 92 thick, the resin flowability at the time of molding is relatively poor. However, due to the seat ribs 92 being shorter than the rotation restricting ribs 88 as described above, effects stemming from poor flowability are hardly felt.

In addition, the seat ribs 92, which are formed to be thick and whose dimensional accuracy is inferior to that of the rotation restricting ribs 88, are formed such that there is no need for them to function to suppress joggling of the clutch member 84. A clearance C2, in the peripheral direction and between the seat rib 92 and the stopper groove 94, is formed to be greater than the clearance C1. In this way, sliding resistance when the clutch member 84 moves up and down either is not generated, or is markedly suppressed. In the present embodiment, a thickness D2 of the seat rib 92 is 2 mm, and the clearance C2 is 0.1 mm.

The heights (i.e., the positions of the top ends) of the rotation restricting ribs 88 and the seat ribs 92 are determined (see FIG. 3) such that the rotation restricting ribs 88 and the seat ribs 92 do not interfere with the projecting pieces 80A of the case 12 which pass through the disc portion 62B of the braking member 60, at the time when the clutch member 84 moves upward and the braking member 60 is positioned at the rotation permitted position.

At the above-described clutch member 84, in the state in which the rotation restricting ribs 88 are inserted in respectively different rotation restricting grooves 90 and the seat ribs 92 are inserted in respectively different stopper grooves 94, the clutch main body 86 is inserted through the through hole 50 and the through hole 54A. Further, usually, the respective seat ribs 92 are maintained in a state of abutting the stopper surfaces 94A, by the urging force of the compression coil spring 82 which is applied via the braking member 60.

In this state, the bottom end surfaces of the rotation restricting ribs 88 are separated slightly from the floor surfaces of the rotation restricting grooves 90 (see FIG. 7B), and the vertical direction position of the press operation surface 86C is positioned slightly (in the present embodiment, 0.1 mm) above the addendum of the reel gear 42 (see FIG. 6). As the reel gear 42 meshes with the driving gear 108 of the drive device, the clutch member 84 is pressed by a release surface 114A of the drive device and moves upward.

Here, to explain the rotating shaft 100, as shown in FIGS. 2 and 3, the rotating shaft 100 is structured such that, in a state in which a flange portion 102A of a rotating shaft portion 102 is fit together with a fit-together concave portion 104B of a rotating table 104, and a magnet 110 is set on a magnet receiving portion 104A, a tap bolt 112 is screwed into a through hole 110A of the magnet 110 and a screw hole 102B, and a head portion 114 of the tap bolt 112 is engaged with a step portion 110B.

Namely, the rotating table 104 and the magnet 110 are nipped between the rotating shaft portion 102 and the head portion 114, and are fixed to the rotating shaft portion 102. In this way, the rotating shaft 100 is structured to rotate integrally on the whole. Moreover, an annular convex portion 106 projects along the outer peripheral portion of the top surface of the rotating table 104. The driving gear 108, which can mesh with the reel gear 42 of the recording tape cartridge 10, is formed at the top surface of the annular convex portion 106.

In the present embodiment, the tap bolt 112 is a bolt having a hexagonal hole. The flat, top end surface (around the hexagonal hole) of the head portion 114 is the release surface 114A (see FIG. 4) which abuts the press operation surface 86C of the clutch member 84. The release surface 114A is finished to a degree of flatness which is equivalent to or greater than that of the top surface of the magnet 110. When the recording tape cartridge 10 is loaded into the drive device, the recording tape cartridge 10 moves downward, and relatively approaches the rotating shaft 100. In this way, the driving gear 108 of the rotating shaft 100 meshes with the reel gear 42 which is exposed from the gear opening 20, and the reel plate 54 is attracted by the magnet 110 of the rotating shaft 100 in a state of being slightly set apart therefrom, and the reel 28 is held at the rotating shaft 100.

Accompanying this meshing operation, the rotating shaft 100 moves upward relative to the case 12. In this way, the press operation surface 86C of the clutch member 84 is pressed by the release surface 114A of the tap bolt 112 (the portion of the rotating shaft 100 which has entered in at the radial direction inner side of the reel gear 42), and moves upward, and the braking member 60 moves to the rotation permitted position. In this way, accompanying the operation of the driving gear 108 meshing with the reel gear 42, the reel 28 rises upward within the case 12 against the urging force of the compression coil spring 82 (i.e., the lower flange 38 is moved away from the annular rib 22), the state in which rotation is impeded by the braking member 60 is released, and the reel 28 becomes able to rotate within the case 12.

In the state in which the reel gear 42 is meshed with the driving gear 108, the state of abutment between the release surface 114A and the press operation surface 86C of the clutch member 84 is maintained, and the braking member 60 is held at the rotation permitted position. When the reel 28 rotates, there is no relative rotation between the clutch member 84 (which rotates integrally with the reel 28) and the rotating shaft 100 (which drives the reel 28), and the press operation surface 86C and the release surface 114A do not slidingly contact one another. The slide-contact surface 86A of the clutch member 84 and the slide-contact projection 70 of the braking member 60 (which cannot rotate with respect to the case 12) slidingly contact one another.

Next, operation of the present embodiment will be described. When the recording tape cartridge 10 having the above-described structure is not being used, due to the urging force of the compression coil spring 82, the braking member 60 is positioned at the rotation locked position, and the braking gear 66 is meshing with the engaging gear 44. Therefore, rotation of the reel 28 with respect to the case 12 is impeded. At this time, the reel gear 42 of the reel 28 is exposed from the gear opening 20, and the clutch main body 86 of the clutch member 84 is inserted through the through hole 50 and the through hole 54A and faces the gear opening 20.

On the other hand, when the magnetic tape T is to be used, the recording tape cartridge 10 is loaded into a bucket (not illustrated) of a drive device along the direction of arrow A. When the recording tape cartridge 10 is loaded to a predetermined depth in the bucket, the bucket is lowered. The rotating shaft 100 of the drive device relatively approaches the gear opening 20 of the case 12 (i.e., moves upward), and holds the reel 28. Specifically, while the reel plate 54 is attracted and held by the magnet 110 in a non-contact state, the driving gear 108 of the rotating shaft 100 meshes with the reel gear 42.

Accompanying this meshing of the reel gear 42 and the driving gear 108, i.e., the relative movement of the rotating shaft 100 toward the side near the case 12 in the axial direction, the release surface 114A (the tap bolt 112) of the rotating shaft 100 abuts the press operation surface 86C of the clutch member 84, and presses the clutch member 84 upward against the urging force of the compression coil spring 82. In this way, the braking member 60, which is abutting the clutch member 84 at the slide-contact projection 70, also moves upward, and the meshing of the engaging gear 44 and the braking gear 66 of the braking member 60 is released. Namely, the braking member 60 reaches the position where relative rotation with respect to the reel 28 is permitted.

When the rotating shaft 100 moves relatively further upward, the reel 28 is raised up together with the clutch member 84 and the braking member 60 (i.e., with their relative positions unchanged) against the urging force of the compression coil spring 82. The braking member 60 reaches the absolute rotation permitted position (the position where rotation with respect to the case 12 is permitted), and the lower flange 38 moves away from the annular rib 22 (the taper surface 22A). In this way, the reel 28 rises up within the case 12, and becomes able to rotate in a state of not contacting the inner surfaces of the case 12.

Due to the lowering of the bucket, i.e. the recording tape cartridge 10, within the drive device, the positioning pins of the drive device enter into the positioning holes 24, 26 of the case 12, and the positioning surfaces of the drive device abut the positioning surfaces 24A, 26A of the case 12. In this way, the recording tape cartridge 10 is positioned in the horizontal direction and the vertical direction with respect to the drive device.

Next, the pull-out mechanism of the drive device pulls the leader block 30 out from the case 12 and guides the leader block 30 to the take-up reel of the drive device, while a pull-out pin (not illustrated) of the pull-out mechanism engages with the engaging recess 30A of the leader block 30. Then, the leader block 30 is fit into the take-up reel, and the arc-shaped surface 30B forms a portion of the take-up surface on which the magnetic tape T is taken up.

When the leader block 30 rotates integrally with the take-up reel in this state, the magnetic tape T is pulled-out from the case 12 through the opening 18 while being taken-up onto the reel hub of the take-up reel. At this time, the reel 28 of the recording tape cartridge 10 rotates synchronously with the take-up reel due to the torque of the rotating shaft 100 which is transmitted by the driving gear 108 which meshes with the reel gear 42.

Information is recorded onto the magnetic tape T or information recorded on the magnetic tape T is played back by a recording/playback head disposed along a predetermined tape path of the drive device. At this time, the slide-contact projection 70 of the braking member 60, which cannot rotate with respect to the case 12, slidingly contacts the slide-contact surface 86A of the clutch member 84 which rotates together with the reel 28 with respect to the case 12.

On the other hand, when the magnetic tape T is rewound onto the reel 28 and the leader block 30 is held in a vicinity of the opening 18 of the case 12, the drive device raises the bucket in which the magnetic tape cartridge 10 is loaded. After the bucket has been raised, the meshing of the reel gear 42 and the driving gear 108 is cancelled, the abutment of the release surface 114A and the slide-contact surface 86A of the clutch member 84 is released, and the clutch member 84 is moved downward, together with the braking member 60, by the urging force of the compression coil spring 82 (with the state of abutment between the clutch member 84 and the braking member 60 maintained).

In this way, the seat ribs 92 of the clutch member 84 abut the stopper surfaces 94A, and the braking gear 66 of the braking member 60 meshes with the engaging gear 44. Namely, the braking member 60 is returned to the rotation locked position at which the braking member 60 impedes rotation of the reel 28 with respect to the case 12. Moreover, as the braking member 60 and the clutch member 84 move due to the urging force of the compression coil spring 82, the reel 28 also moves downward. The reel gear 42 is returned to its initial state of being exposed from the gear opening 20, while the lower flange 38 of the reel 28 is made to abut the annular rib 22. In this state, the recording tape cartridge 10 is discharged from the bucket.

Here, at the recording tape cartridge 10, the base portion 62 of the braking member 60 has the tubular portion 62A in which the upper portion of the clutch member 84 is disposed (i.e., the tubular portion 62A which overlaps the boss portion 52 for a clutch in a non-contact state). Therefore, a structure is realized in which the rotation restricting ribs 88 and the seat ribs 92 of the clutch member 84 are supported at the boss portion 52 for a clutch within the reel hub 32, while the function of making the meshed position of the braking gear 66 and the engaging gear 44 low is maintained. Moreover, a structure is realized in which, while the strength of the braking member 60 is sufficiently ensured, there is no resistance (friction) from the horizontal direction with respect to the braking member 60 at the time when the braking member 60 moves (i.e., rises and falls).

Moreover, because the clearances C1, C2 are formed between the clutch member 84 and the boss portion 52 for a clutch, there is the concern that dust or the like may enter therein. However, at least when the reel 28 is at the rotation locked position, the tubular portion 62A covers the top portion of the clutch member 84 and the top portion and the outer periphery of the boss portion 52 for a clutch, with a predetermined gap therebetween (i.e., the tubular portion 62A overlaps them in a non-contact state). Therefore, this region is a labyrinthine structure, and further penetration of dust and the like therein is suppressed. Accordingly, the dustproof quality is improved, and the adhesion of dust and the like to the magnetic tape T is prevented. Note that the annular rib 22 projects toward the inner side of the case 12 at the edge portion of the gear opening 20 at the floor plate 16A of the lower case 16. When the recording tape cartridge 10 is not in use (i.e., when the reel 28 is at the rotation locked position), the annular rib 22 abuts the bottom surface of the reel 28 (the outer side of the reel gear 42). Therefore, dustproofing of this region is also carried out. In this way, the recording tape cartridge 10 which has an excellent dustproof quality (a superior dustproof quality) is realized.

The upper portion of the clutch main body 86 at the clutch member 84, and the boss portion 52 for a clutch and the tubular portion 62A are disposed at the radial direction inner side of the engaging gear 44. Therefore, in a structure having the clutch member 84, a structure in which the engaging gear 44 is formed continuously and in an annular form is realized. Therefore, due to the engaging gear 44, the centering function of the braking member 60 is improved, and riding-up of the braking member 60 on the addendum of the engaging gear 44, when the braking member 60 is assembled, is prevented. In addition, the amount of meshing of the braking gear 66 and the engaging gear 44 is increased, and the ability of the braking member 60 to brake the reel 28 is improved. In this way, it is also possible to reduce the amount of engagement, per tooth, between the braking gear 66 and the engaging gear 44 so as to shorten the release stroke, and to decrease the urging force of the compression coil spring 82, thus reducing the strength required of the respective portions (i.e., providing leeway I terms of necessary strength).

The clutch member 84 passes through the through hole 50, and a portion of the clutch main body 86 is disposed at the plate portion of the floor portion 36. Therefore, the amount of projection of the floor portion 36 toward the top surface side is suppressed. As a result, a structure is realized in which the braking member 60, which always abuts the slide-contact surface 86A, is disposed at a position near the floor portion 36, and the height of the engaging gear 44 is kept low. In this way, the meshed position of the braking gear 66 of the braking member 60 and the engaging gear 44 of the reel 28 is in a vicinity of the center of gravity of the reel 28, and the ability of the braking member 60 to brake the reel 28 is further improved. Moreover, the thickness of the pedestal portion 46 at which the engaging gear 44 is formed is reduced, and the moldablity at the time of molding the reel hub 32, which is formed by resin molding, is improved.

Moreover, due to the press operation surface 86C of the clutch member 84 passing through the through hole 50 and the through hole 54A which are positioned at the axially central portion of the reel hub 32, a structure is realized in which the clutch member 84 is pressed by the release surface 114A other than the magnet 110, while the effective surface areas of the magnet 110 and the reel plate 54 are maintained. In this way, due to the simple structure of the rotating shaft 100, i.e., due to the release surface 114A of the head portion 114 at which the degree of flatness is easier to ensure than that of the magnet 110, the locked state of the reel 28 can be stably released while tilting of the clutch member 84 with respect to the axial direction is suppressed.

Moreover, at the time when the locking is released, the flat release surface 114A presses the flat press operation surface 86C in a state in which there is face-contact between the two. Therefore, no friction arises at the press operation surface 86C, which is made of resin, due to this pressing. Moreover, when the reel 28 rotates, the clutch member 84 rotates together with the rotating shaft 100. Therefore, no friction arises at the press operation surface 86C accompanying this rotation. As a result, there is no reduction in the release stroke due to friction of the clutch member 84, and release of the locking by the clutch member 84 can be carried out reliably. Note that, in the present embodiment, the release stroke is substantially equivalent to the height of the teeth of the reel gear 42.

The release surface 114A must be provided at the rotating shaft 100 of the drive device. However, as described above, the release surface 114A and the press operation surface 86C do not slidingly contact one another. Therefore, there is no need to form the release surface 114A of a resin material, and the structure of the rotating shaft 100 does not become complex. Specifically, the release surface 114A is structured by the head portion 114 of the tap bolt 112 which fixes the rotating table 104 and the magnet 110 to the rotating shaft portion 102. Thus, in providing the release surface 114A, there is no increase in the number of parts or the number of assembly processes. In addition, because the tap bolt 112 is screwed into the screw hole 102B of the rotating shaft portion 102 from above, there are no constraints on the structure of the bottom end side of the rotating shaft portion 102, i.e., on the layout and the like of the motor which drives and rotates the rotating shaft portion 102, and the like.

Note that, in the above-described embodiment, the recording tape cartridge 10 has the leader block 30. However, the present invention is not limited to the same. For example, the recording tape cartridge 10 may be structured such that a small, solid-cylindrical leader pin is attached as a leader member to the distal end of the magnetic tape T, or may be structured so as to have a shielding member which opens and closes the opening 18 (a sliding door or the like which moves along a predetermined straight line or arc).

In addition, the magnetic tape T is used as the recording tape. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

As described above, in accordance with the embodiment of the present invention, a tubular wall portion, which is formed at a braking member, overlaps the outer side of a guide wall portion, at least at a rotation locked position. In this way, it is possible to suppress further penetration of dust or the like which enters in from the gap between a releasing member and the guide wall portion. Accordingly, the dust-proof quality can be improved.

What is claimed is:

1. A recording tape cartridge comprising:
   a reel accommodated within a case and having a reel hub around which a recording tape is wound, an engaging portion being provided at a floor portion of the reel hub;
   a braking member provided nonrotatably within the case, and approaching and moving away from the floor portion of the reel hub, and able to assume a rotation locked position at which the braking member engages with the engaging portion, and a rotation permitted position at which a state of engagement with the engaging portion is released; and
   a releasing member disposed so as to rotate integrally with the reel at an inner side of a guide wall portion which stands erect at the floor portion of the reel hub, and when the reel is rotated, the releasing member holds the braking member at the rotation permitted position while abutting the braking member,
   wherein the braking member has a tubular wall portion which overlaps with an outer side of the guide wall portion at least at the rotation locked position.

2. The recording tape cartridge of claim 1, wherein the tubular wall portion is positioned further inward in a radial direction than the engaging portion.

3. The recording tape cartridge of claim 1, wherein the tubular wall portion is positioned between the engaging portion and the guide wall portion.

4. The recording tape cartridge of claim 1, wherein the releasing member has at least a first rib and a second rib whose lengths, in a direction of thickness of the recording tape cartridge, are different.

5. The recording tape cartridge of claim 4, wherein the first rib and the second rib are positioned further inward in a radial direction than the guide wall portion.

6. The recording tape cartridge of claim 4, wherein the first rib and the second rib are disposed alternately at a uniform interval in a peripheral direction of the reel hub.

7. The recording tape cartridge of claim 4, wherein the reel hub includes grooves which accommodate the first rib and the second rib respectively.

8. The recording tape cartridge of claim 7, wherein thicknesses of the first rib and the second rib, in a peripheral direction of the reel hub, are respectively different.

9. The recording tape cartridge of claim 8, wherein the thickness of the first rib or the second rib, whichever is longer, is less than the thickness of the shorter rib, and when said ribs are accommodated in the grooves of the reel hub, the clearance between the longer rib and the groove in a peripheral direction is less than the clearance between the shorter rib and the groove in a peripheral direction.

10. The recording tape cartridge of claim 1, wherein the releasing member abutting the braking member is provided with a slide-contact surface that slidingly contacts the braking member, and, around the periphery of the slide-contact surface, provided with rotation restricting ribs which extend in a rotation axis direction of the reel and prevent the releasing member from rotating relative to the reel by fitting into grooves formed at an inner surface of the guide wall portion, and seat ribs which extend in the rotation axis direction of the reel and preventing the releasing member from falling-out from the reel by abutting the floor portion of the reel hub, wherein the rotation restricting ribs and the seat ribs are formed projecting radially further than the slide-contact surface of the releasing member toward the side of the braking member.

11. The recording tape cartridge of claim 10, wherein the heights from a slide-contact surface of end surfaces toward the braking member of both the rotation restricting ribs and the seat ribs are the same, while the heights from the slide-contact surface of the end surfaces toward the floor portion of the reel hub of the rotation restricting ribs and the seat ribs are not the same.

12. A recording tape cartridge comprising:
    a reel accommodated within a case and having a reel hub around which a recording tape is wound, an engaging portion being provided at a floor portion of the reel hub;
    a braking member, which includes a tubular wall portion, provided nonrotatably within the case, and approaching and moving away from the floor portion of the reel hub, and able to assume a rotation locked position at which the braking member engages with the engaging portion, and a rotation permitted position at which a state of engagement with the engaging portion is released; and a releasing member disposed so as to rotate integrally with the reel at an inner side of a guide wall portion, which stands erect at the floor portion of the reel hub, and when the reel is rotated, the releasing member holds the braking member at the rotation permitted position while abutting the braking member, wherein when the recording tape cartridge is in an assembled state, the releasing member, the guide wall portion, and the tubular wall portion are formed in a labyrinthine structure when viewed from a side sectional view of the recording tape cartridge, and wherein the tubular wall portion is positioned between the engaging portion and the guide wall portion.

13. A recording tape cartridge comprising:

a reel accommodated within a case and having a reel hub around which a recording tape is wound, an engaging portion being provided at a floor portion of the reel hub;

a braking member, which includes a tubular wall portion, provided nonrotatably within the case, and approaching and moving away from the floor portion of the reel hub, and able to assume a rotation locked position at which the braking member engages with the engaging portion, and a rotation permitted position at which a state of engagement with the engaging portion is released; and a releasing member disposed so as to rotate integrally with the reel at an inner side of a guide wall portion, which stands erect at the floor portion of the reel hub, and when the reel is rotated, the releasing member holds the braking member at the rotation permitted position while abutting the braking member, wherein when the recording tape cartridge is in an assembled state, the releasing member, the guide wall portion, and the tubular wall portion are formed in a labyrinthine structure when viewed from a side sectional view of the recording tape cartridge, and wherein the releasing member has at least a first rib and a second rib whose lengths, in a direction of thickness of the recording tape cartridge, are different.

14. The recording tape cartridge of claim 13, wherein the first rib and the second rib are positioned further inward than the guide wall portion.

15. A recording tape cartridge comprising:

a reel accommodated within a case and having a reel hub around which a recording tape is wound, an engaging portion being provided at a floor portion of the reel hub;

a braking member, which includes a tubular wall portion, provided nonrotatably within the case, and approaching and moving away from the floor portion of the reel hub, and able to assume a rotation locked position at which the braking member engages with the engaging portion, and a rotation permitted position at which a state of engagement with the engaging portion is released; and a releasing member disposed so as to rotate integrally with the reel at an inner side of a guide wall portion, which stands erect at the floor portion of the reel hub, and when the reel is rotated, the releasing member holds the braking member at the rotation permitted position while abutting the braking member, wherein when the recording tape cartridge is in an assembled state, the releasing member, the guide wall portion, and the tubular wall portion are formed in a labyrinthine structure when viewed from a side sectional view of the recording tape cartridge, and wherein the releasing member abutting the braking member is provided with a slide-contact surface that slidingly contacts the braking member, and, around the periphery of the slide-contact surface, provided with rotation restricting ribs which extend in a rotation axis direction of the reel and prevent the releasing member from rotating relative to the reel by fitting into grooves formed at an inner surface of the guide wall portion, and seat ribs which extend in the rotation axis direction of the reel and preventing the releasing member from falling-out from the reel by abutting the floor portion of the reel hub, wherein the rotation restricting ribs and the seat ribs are formed projecting radially further than the slide-contact surface of the releasing member toward the side of the braking member.

16. The recording tape cartridge of claim 15, wherein the heights from a slide-contact surface of end surfaces toward the braking member of both the rotation restricting ribs and the seat ribs are the same while the heights from the slide-contact surface of the end surfaces toward the floor portion of the reel hub of the rotation restricting ribs and the seat ribs are not the same.

* * * * *